Jan. 22, 1957  A. F. PFINGSTEN  2,778,439
COMBINATION RADIATOR SCREEN AND INSECT
DEFLECTOR FOR WINDSHIELDS
Filed Oct. 2, 1953
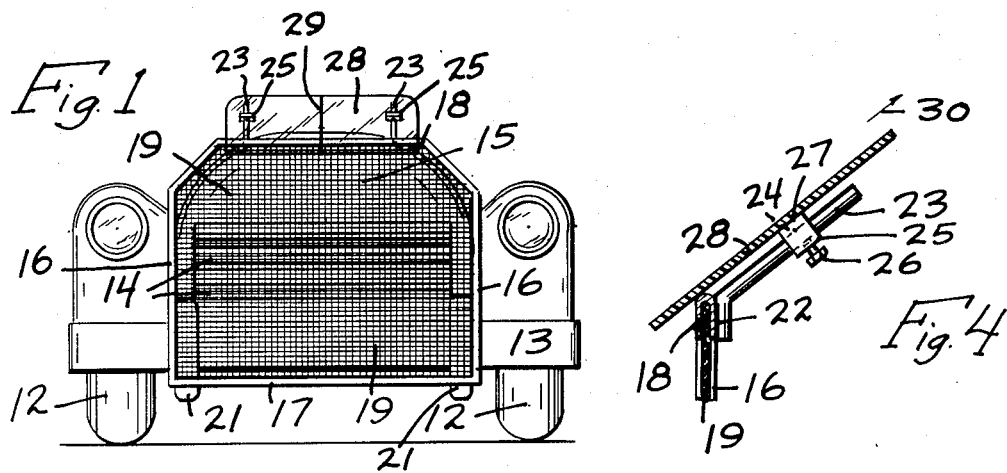
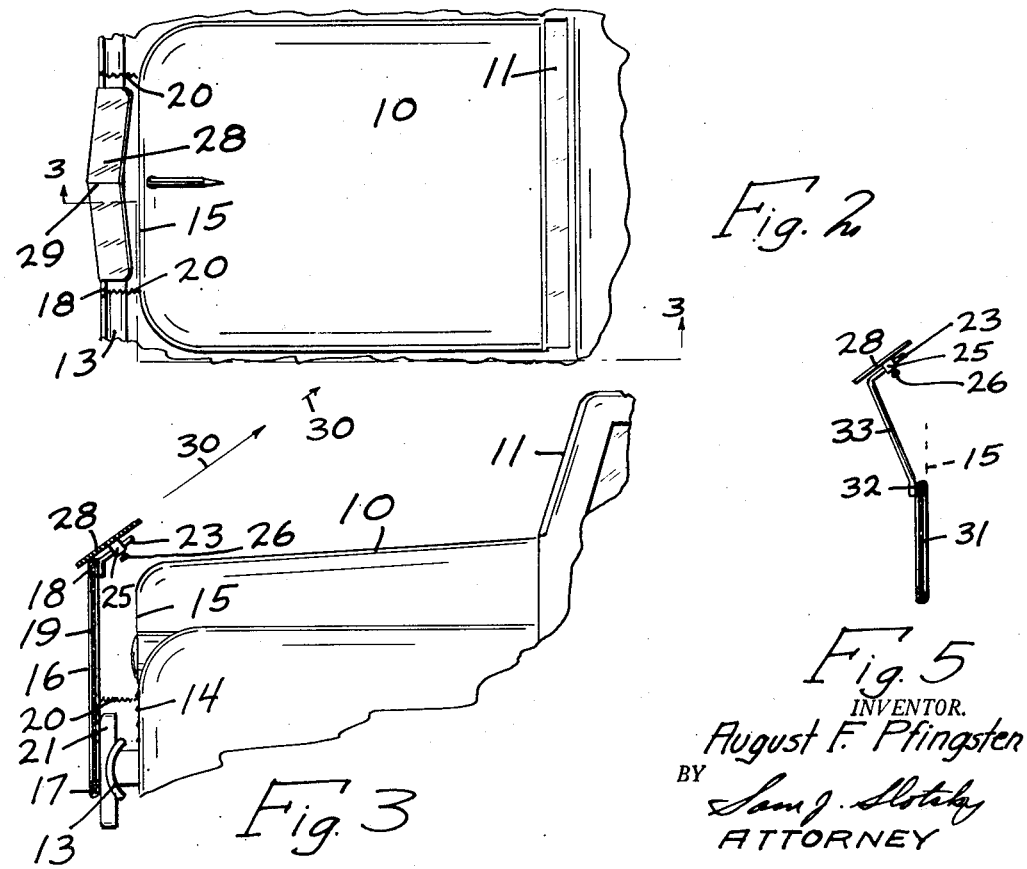
INVENTOR.
August F. Pfingsten
BY
Sam J. Slotsky
ATTORNEY

2,778,439

Patented Jan. 22, 1957

2,778,439

COMBINATION RADIATOR SCREEN AND INSECT DEFLECTOR FOR WINDSHIELDS

August F. Pfingsten, Rock Rapids, Iowa

Application October 2, 1953, Serial No. 383,851

1 Claim. (Cl. 180—68)

My invention relates to an insect screen and deflector.

An object of my invention is to provide an insect deflector for windshields which is an integral extending part of a radiator screen, and which provides certain advantages in deflecting insects from the windshield of a moving automobile.

A further object of my invention is to provide an insect deflecting shield of this type which will automatically be installed when the screen is installed, which is in the proper position for insuring the maximum deflection of insects, and which can be adjusted.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a forward elevation of the deflector and screen as attached to an automobile, Figure 2 is a plan view of Figure 1, Figure 3 is a side sectional elevation of Figure 2 taken along the lines 3—3 thereof, Figure 4 is an enlarged detail taken partially in section, and Figure 5 is a modification.

My invention contemplates the provision of an insect deflector which is directly attached to the top of an automobile radiator or grill screen, with the deflector being so arranged as to provide an efficient deflection of bugs, insects etc., which will be deflected away from the screen due to the natural wind forces which wind forces will be caused to travel in certain planes out of the planes in which the windshield travels.

I have used the character 10 to designate the hood of an automobile, the character 11 indicating the windshield thereof, the character 12 indicating the wheels, and the character 13 indicating the bumper, with the character 14 indicating the forward grill portions of the automobile and the character 15 indicating further forward portions of the hood.

The device of my invention comprises a framework 16 extending into the further framework portions 17 and 18, and secured in these framework portions is a mesh screen 19 which is adapted to be secured by means of the spring members 20, which are suitably hooked into the grill, and with any other further suitable attaching means being provided to secure the framework against the bumper members 21, it being thus noted that the screen member will be ahead of the grill and the hood.

Attached at 22 to the upper framework portion 18 are a pair of angularly extending rods 23 which pass through the openings 24 in the blocks 25, and threadably engaged with the blocks 25 are the lock screws 26. Attached at 27 to the blocks 25 is the angularly inclined transparent insect deflector 28 which is slightly bent at the central portion 29 thereof to provide rearwardly sloping sides as shown in Figure 2. This member 28 can be made of a clear plastic or any other suitable material.

As the automobile travels forwardly, wind forces will be created, which wind forces will pass upwardly along the member 28 in the direction of the arrows 30 (see Figure 2), it being noted that these wind forces will be directed substantially above the top of the windshield 11, so that as a result insects and other objects which tend to fall toward the windshield will be carried away from the same thereby protecting the windshield. The angularity of the member 28 is such as to provide the maximum amount of wind forces passing over the top of the windshield so as to preclude the possibility of the insects passing within a dead wind area, and to provide further adjustment consistent with the length of the hood etc. The screws 26 can be loosened so that the member 28 can be placed at various desired elevations to obtain the best results.

It should be understood that the screen itself can be made of any desirable contour other than that shown, and it will be noted that the sloping sides of the member 28 also will provide wind forces laterally to deflect the insects.

A modification is shown in Figure 5 wherein identical characters indicate similar parts, and in which modification the character 31 indicates a relatively smaller screen of the type which is used to cover the grill only, to which is attached at 32 a pair of bars 33 which will support the same structure above described, this device pertaining to this particular type of structure wherein the screen will cover the grill height only.

It will be noted from both structures that sufficient clearance is allowed so that the hood can be conveniently raised without disturbing any portions of the device.

It will now be noted that I have provided the advantages set forth in the objects of my invention with various other advantages being readily apparent.

Some changes may be made in the construction and arrangement of the parts of my invention without departing from the real spirit and purpose of my invention, and it is my intention to cover by my clam any modified forms of structure or use of mechanical equivalents which may be reasonably included within their scope.

I claim as my invention:

A combination radiator screen and insect deflector for windshields comprising a radiator screen member, an insect deflector member adjustably mounted on said screen member and extending upwardly therefrom, said insect deflector member including a flat sheet member, said flat sheet member being angularly inclined to deflect wind forces toward and above a windshield, means for adjustably mounting and securing said insect deflector member to said screen member so that said insect deflector member can be positioned at desired vertical heights, said adjustable securing means including a pair of angularly positioned bars secured to the upper edge of said screen member, block received by said bars for adjustable movement thereof, said insect deflector member being secured to said blocks.

References Cited in the file of this patent

UNITED STATES PATENTS

| 2,229,516 | Metzger | Jan. 21, 1941 |
| 2,501,065 | Longeway | Mar. 21, 1950 |
| 2,638,376 | Berry | May 12, 1953 |

FOREIGN PATENTS

| 155,730 | Great Britain | Dec. 30, 1920 |